United States Patent [19]

Beuch et al.

[11] 4,170,031
[45] Oct. 2, 1979

[54] LOADING MECHANISM FOR MAGNETIC DISKETTES

[75] Inventors: Wallace E. Beuch, Pine Island; Curtis A. Larson, Rochester; Michael N. Zell, Rochester; Thomas R. Fournier, Rochester, all of Minn.

[73] Assignee: International Business Machines Corporation, Armonk, N.Y.

[21] Appl. No.: 888,603

[22] Filed: Mar. 20, 1978

[51] Int. Cl.² .................... G11B 17/00; G11B 5/82; G11B 25/04
[52] U.S. Cl. .................................. 360/98; 346/137; 360/99
[58] Field of Search .................. 360/98, 99, 97, 86, 360/133, 135; 346/137

[56] References Cited

U.S. PATENT DOCUMENTS

| | | | |
|---|---|---|---|
| 1,540,376 | 6/1925 | Thompson | 274/10 |
| 1,970,417 | 8/1934 | Dahlstrom | 274/10 |
| 3,662,344 | 5/1972 | Menke | 274/10 |
| 3,678,481 | 7/1972 | Dalziel et al. | 360/97 |
| 3,789,160 | 1/1974 | Breur et al. | 360/98 |
| 3,815,150 | 6/1974 | Stoddard et al. | 360/99 |
| 3,846,836 | 11/1974 | Masse et al. | 360/98 |
| 3,891,796 | 6/1975 | Takahara et al. | 360/99 |
| 4,040,107 | 8/1977 | Bryer | 360/99 |

OTHER PUBLICATIONS

IBM Tech. Disc. Bull., Baker et al., Rack-Mounted Diskette Storage Device, vol. 19, No. 10, Mar. 1977, pp. 3833-3836.

*Primary Examiner*—Alfred H. Eddleman
*Attorney, Agent, or Firm*—Keith T. Bleuer

[57] ABSTRACT

A machine operative to sequentially pull jacketed flexible magnetic disk units (which may be termed "diskettes") into a data transferring position, close a collet on a disk driving spindle for clamping the disk onto the spindle for drivingly rotating the disk from the spindle and move magnetic heads into contact with the disk for a data transferring action. The machine includes a clothespin like picker or gripping device reciprocative so as to move into embracing relationship with the diskette and to then pull the diskette into data transferring position. The diskettes are contained in a magazine which is translatable transversely with respect to the path of travel of the picker device so that the picker device may be operative to grip any one of the series of diskettes, depending on the translated position of the magazine. The picker device is driven from an electrical stepping motor driving a pulley which in turn drives a belt operatively connected with the picker device, and the pulley carries a pair of cams one of which is effective on a swing arm for moving the collet into engagement with the driving spindle and the other of which is effective on a swing arm for causing engagement of the magnetic heads with the disk for a data transferring action.

15 Claims, 14 Drawing Figures

LOADING MECHANISM FOR MAGNETIC DISKETTES

CROSS-REFERENCES TO RELATED APPLICATIONS

The inventions of the following patent applications are considered to be related to the invention herein:

Magazine For Multiple Magnetic Diskettes, Inventors: W. L. Aderman et al, Ser. No. 888,436, filed Mar. 20, 1978;

Magnetic Diskette Magazine, Inventor: D. Wilson, Ser. No. 888,435, filed Mar. 20, 1978.

Magazine-Lid Combination For Jacketed Magnetic Disks, Inventors: M. Bothun et al, Ser. No. 888,438, filed Mar. 20, 1978.

Gripping Device For Magnetic Diskettes, Inventors: W. Beuch et al, Ser. No. 888,601, filed Mar. 20, 1978.

Drive Machine Moving Magnetic Disks Only Partially Therein For Data Transfer, Inventors: D. Castrodale et al, Ser. No. 888,437, filed Mar. 20, 1978.

BACKGROUND OF THE INVENTION

The invention relates to jacketed magnetic record disk units (which may be termed "diskettes"), and still more particularly the invention relates to a disk file machine for selectively drawing such diskettes into the machine for a data transferring action.

Jacketed magnetic disks or diskettes have previously been proposed, for example, in U.S. Pat. No. 3,668,658. A disk file machine for utilizing a series of such diskettes has also been proposed in U.S. Pat. No. 3,846,836. The machine disclosed in the latter patent includes a bin on top of the machine for holding a series of the diskettes. The diskettes are dropped serially, one at a time, out of the bin into a data transferring position; and the machine includes mechanism for then closing a collet on a driving spindle so as to drive the disk within its jacket. The machine also includes means for substantially at the same time moving a transducer into engagement with the disk through a slot provided in the diskette for a data transferring action. When this action is completed, the steps are reversed. The collet and magnetic head are moved back out of operative positions, and mechanical lifting apparatus is provided so as to move a diskette in data transferring position upwardly back into the bin, particularly into a used diskette section of the bin. The next diskette of the series is then processed in the same manner by the machine.

SUMMARY OF THE INVENTION

It is an object of the present invention to provide an improved disk file machine particularly for jacketed flexible magnetic disk units or diskettes by means of which any one of a series of such diskettes may be selectively loaded into a data transferring position. It is a further object of the invention to provide such a machine which draws any one of a series of diskettes out of a magazine and moves them horizontally into a data transferring position, with the machine including means for then closing a collet and moving a transducer into contact with the disk in data transferring position.

Still more particularly, it is an object of the invention to provide an improved machine of this type which includes a clothespin type picker device which reciprocates to embrace and engage a diskette in a magazine and move it horizontally into a data transferring position and after data transfer is completed to move the diskette back into the magazine. It is still an additional object to provide improved mechanism, preferably driven by an electrical stepping motor, for moving such a picker device horizontally in reciprocation and in timed relationship with such movement to engage and disengage the collet and transducer.

In a preferred form, the machine includes a motor of the electrical stepping type driving a pulley which in turn drives a belt. A reciprocative picker device for embracing and pulling a diskette out of a magazine into data transferring position and for returning the diskette to original position is driven from the belt, and the pulley and belt are accordingly driven in one direction or the other from the motor. The pulley includes a pair of cams respectively operative to engage a collet with respect to a drive spindle for driving the disk and for engaging a transducer with respect to the disk in its data transferring position; and, for this purpose, a lost motion connection is provided between the picker device and belt so that movement of the pulley and belt may continue after the picker device has been effective to pull the diskette into its data transferring position whereby the cams may then be operative to move the collet and transducer into their engaging positions.

DESCRIPTION OF THE PREFERRED EMBODIMENT

Figure 13:
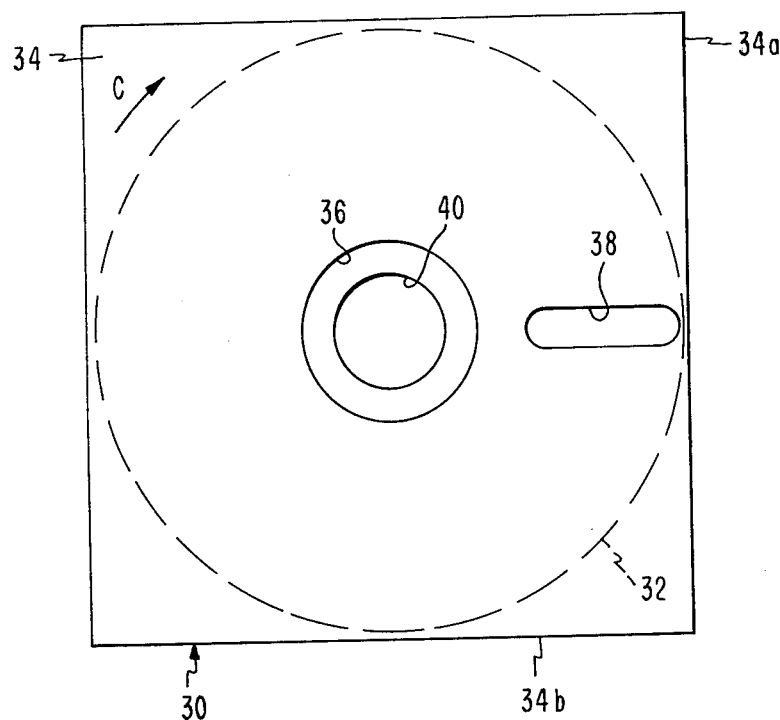
FIG. 13 is a plan view of a disk-jacket unit or "diskette" that may be used in the machine.
Figure 14:
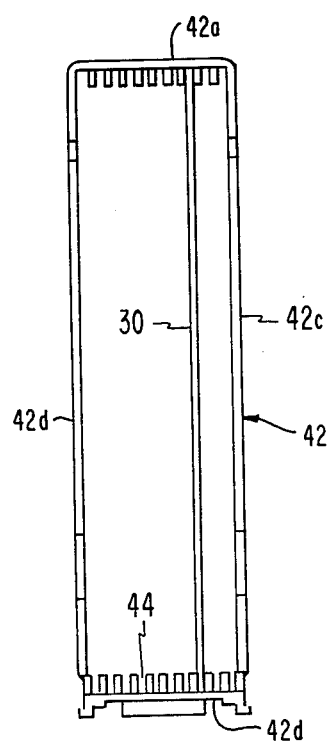
FIG. 14 is a cross-sectional view of one of the magazines useable with the machine and taken on line 14—14 of FIG. 1.

The disk file machine shown in FIGS. 1-11 utilizes jacketed magnetic disk units or assemblies 30 of the type disclosed in U.S. Pat. No. 3,668,658. These may be termed "diskettes". Such an assembly 30 is shown in FIG. 13 and comprises a thin flexible magnetic disk 32 rotatably disposed in a square jacket 34 of somewhat thicker material. The jacket 34 has coincident central openings 36 and coincident radially extending oblong openings of slots 38 in its two thicknesses. The disk 32 has a central opening 40 which is of smaller diameter than the openings 36 so that the disk 34 is revealed within the openings 36.

The jacketed disk assemblies 30 may be used individually by the disk drive machine or may be disposed in an aligned series within magazines 42 which are adapted to be received by the machine. Each of the magazines 42 is provided with opposing grooves 44 in upper and lower surfaces, and disk assemblies 30 are held from sideward movement in the magazine by the sides of the grooves 44. Each of the magazines 42 comprises a top 42a, an opposite bottom 42b, opposite sides 42c and 42d and an end 42e all of which are substantially imperforate, leaving the other end of the cartridge 42 open.

Figure 1:
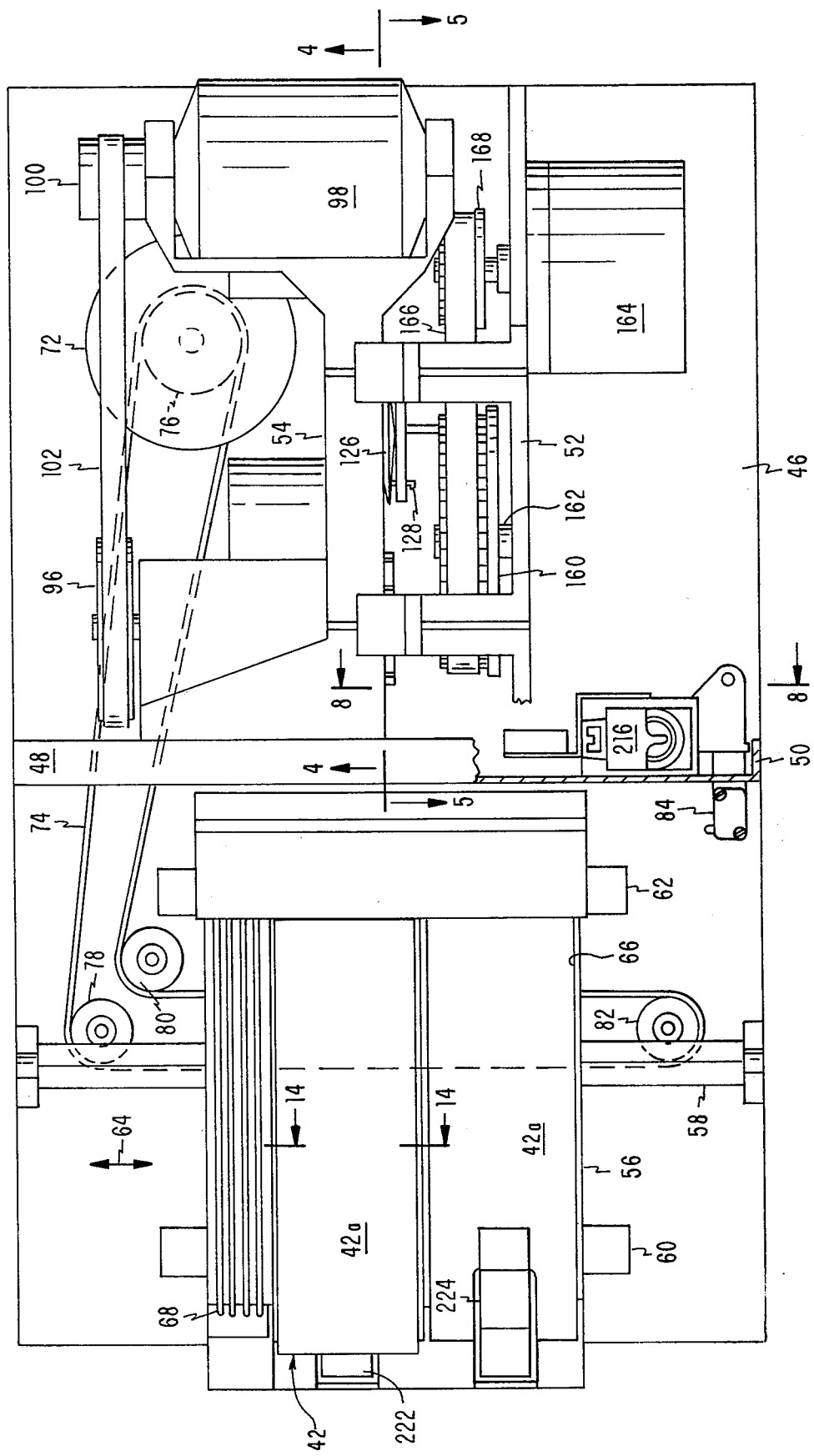
FIG. 1 is a top plan view of the disk file machine of the invention in which a so-called "front" end of the machine, on which a diskette magazine is mounted, is shown on the left end of the figure.
Figure 2:
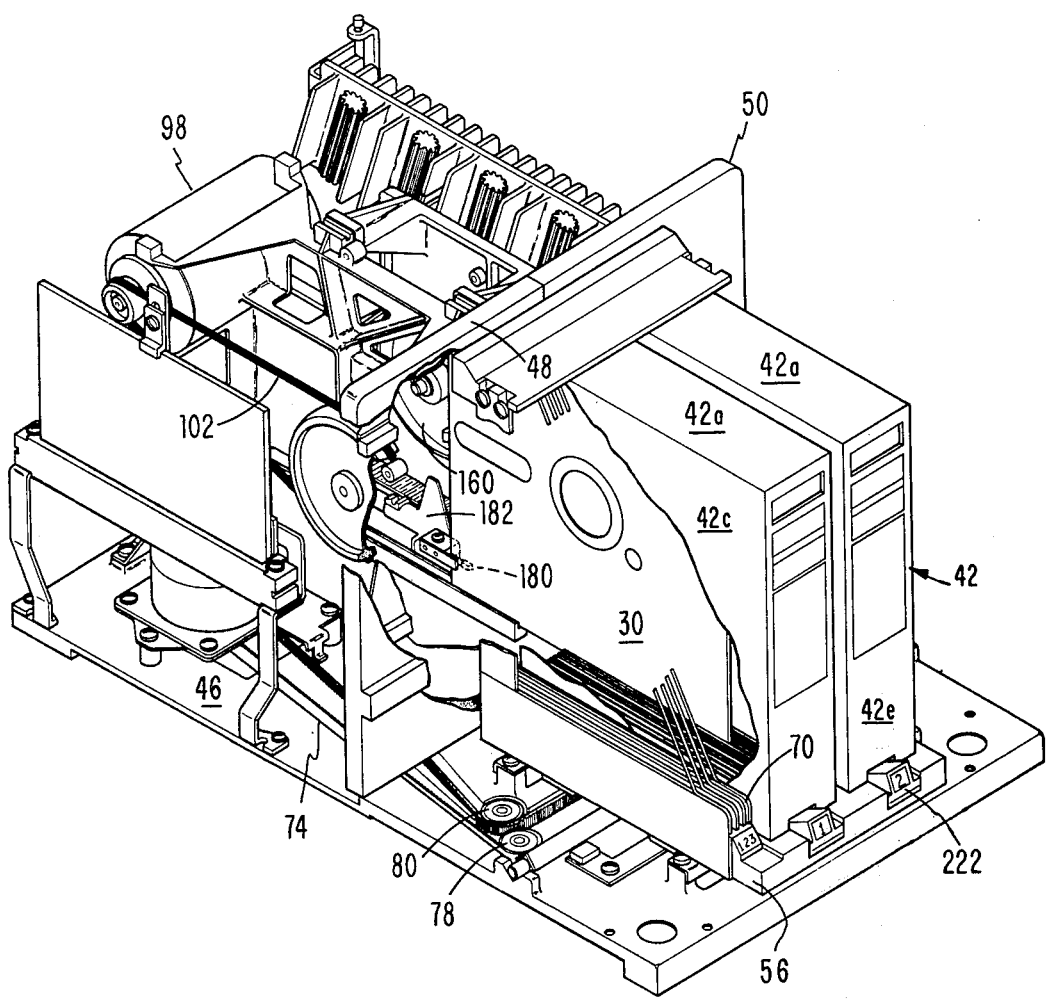
FIG. 2 is an isometric view of the machine taken from the left front end thereof and showing a pair of the magazines and showing also a pair of electronic boards on the left and right sides of the machine.

The machine comprises a rigid horizontal bed or base 46, a pair of upright standards 48 and 50 fixed to the base 46 and a pair of upright backbones 52 and 54 also fixed to the base 46 (see FIG. 1). A carriage 56 for receiving the magazines 42 and also for receiving individual disk assemblies 30 is translatably disposed on the base 46 by means of a center rail 58 and a pair of side rails 60 and 62. Suitable rollers or other low friction bearing means may be provided for supporting the carriage 56 with respect to the rails 58, 60 and 62 so that the carriage 56 may move in the direction 64 across the bed 46. The carriage 56 is provided with a pair of cavities 66 each for receiving one of the magazines 42 and is also provided with a series of upstanding spaced support rods 68 between which the disk assemblies 30 may be individually disposed. The carriage 56 is provided with horizontal bottom grooves 70 disposed between each of the spaces between the rods 68 for supporting the lower edges of the individual disk assemblies 30 disposed between the rods 68.

The carriage 56 is moved in the direction 64 by means of a motor 72 which is preferably of the electrical stepping type. This is accomplished by means of a belt 74 which is of rubber like material and is preferably internally toothed. The belt 74 passes over the drive pulley 76 of the motor 72 and over idlers 78, 80 and 82. The pass of the belt 74 between the idlers 78 and 82 is fixed to the carriage 56 so that, as the belt 74 is driven by the motor 72, it moves the carriage 56 in the direction 64. A sensor switch 84 is provided at one end of the travel of the carriage 56.

A diskette receiving slot 86 (see FIGS. 3 and 4) is provided between the standards 48 and 50, and a diskette supporting member 88 is fixed to the lower edge of the backbone 52 and extends partially into the slot 86. The member 88 is provided with a horizontal groove 90 for receiving a diskette 30 moved into the machine through the slot 86, and a protrusion 91 on the backbone 52 limits movement of the diskette 30 in the slot 90. A sensor switch 92 is provided at the end of the groove 90 remote from the slot 86.

Figure 4:
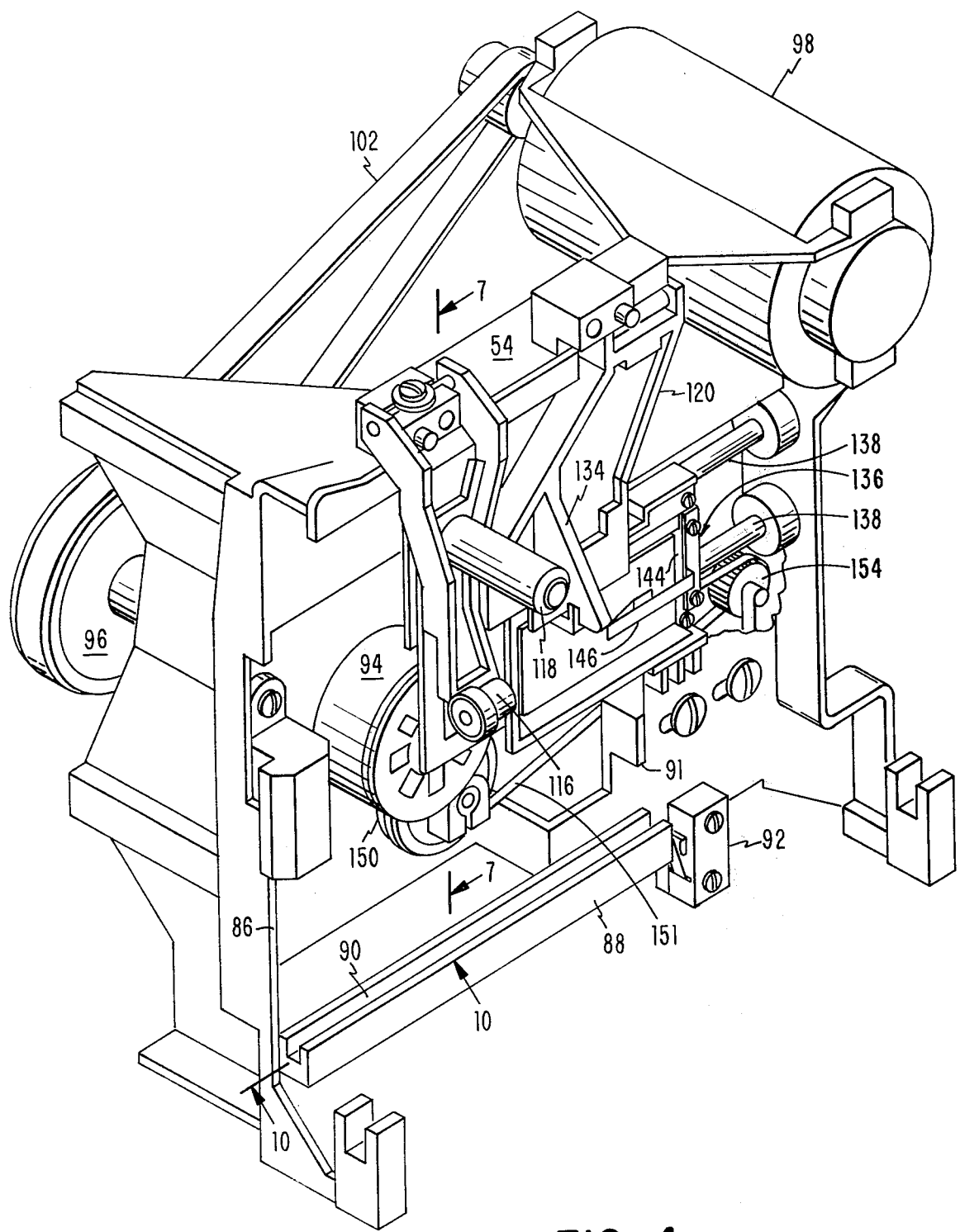
FIG. 4 is an isometric view of internal parts of the machine and taken substantially from line 4—4 of FIG. 1 in the direction indicated.

A disk drive spindle 94 is rotatably disposed in the backbone 54, and the spindle 94 is rotatably driven by means of a pulley 96 fixed with respect to the spindle 94 (see FIGS. 1 and 4). The pulley 96 and therefore the spindle 94 are driven from a drive motor 98 by means of the driven pulley 100 of the motor 98 and a belt 102 extending around the pulleys 100 and 96.

Figure 7:
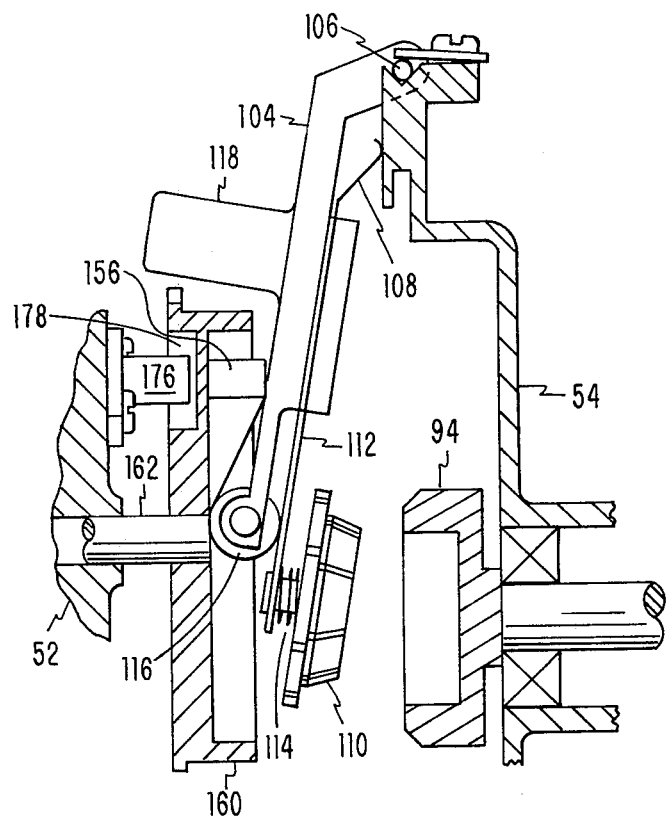
FIG. 7 is a sectional view on an enlarged scale taken on line 7—7 of FIG. 4.
Figure 8:
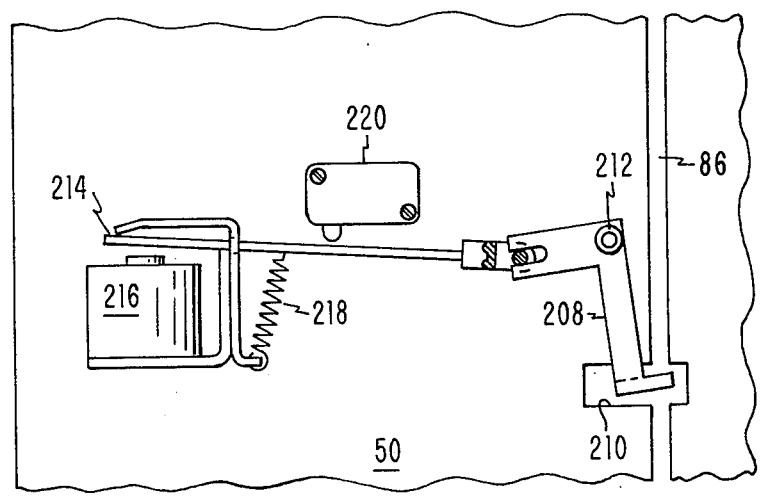
FIG. 8 is a fragmentary sectional view on an enlarged scale taken on line 8—8 of FIG. 1.
Figure 9:
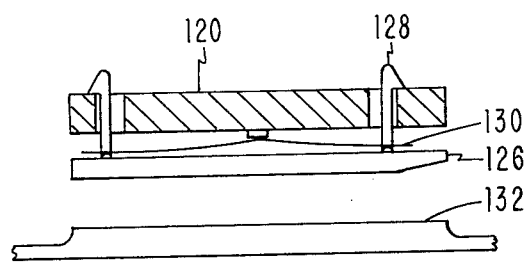
FIG. 9 is a sectional view on a reduced scale taken on line 9—9 of FIG. 6.

An arm 104 is swingably mounted on the backbone 54 by means of a pivot rod 106 (see FIG. 7). A return spring 108 is effective on the swing arm 104 for yieldably holding the arm 104 swung clockwise, viewing the arm as in FIG. 7. A collet 110 is carried by and has a lost motion connection with a downward extension 112 of the swing arm 104, and a coil spring 114 is provided between the collet and the extension 112. The swing arm 104 carries a roller 116 on its lower end and has a sidewardly extending extension 118 rigidly fixed with respect to the rest of the arm 104 and located approximately midway between the pivot rod 106 and the lower end of the arm 104.

Figure 6:
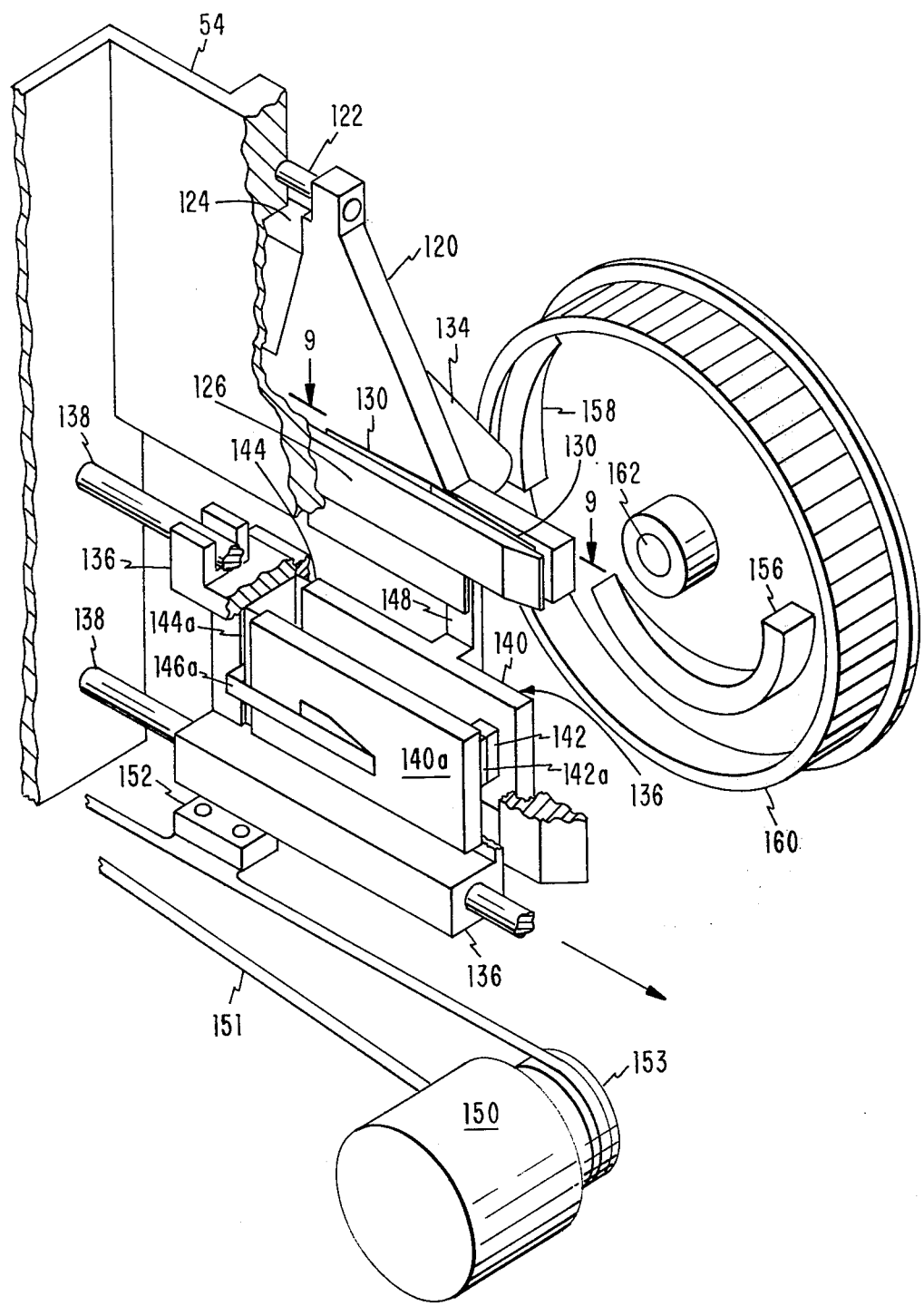
FIG. 6 is a fragmentary isometric view taken from substantially the same standpoint as FIG. 5 and showing the cam wheel above-mentioned along with other internal parts moveable under the action of the cam wheel.

An arm 120 is swingably disposed on the backbone 54 by means of a pivot rod 122 (see FIG. 6), and a return spring 124 is effective between the swing arm 120 and the backbone 54 for yieldably holding the swing arm 120 swung outwardly in the counterclockwise direction as seen in FIG. 6. The swing arm 120 carries a pressure member 126 having a lost motion connection with the swing arm 124 by virtue of a pair of ears 128 integral with the pressure member 126 and extending through slots in the swing arm 120 and formed to overlie the back surface of the swing arm 120 (see FIG. 9). A leaf spring 130 is disposed between the pressure member 126 and the swing arm 120 for yieldably holding the portions of the ears 128 overlying the swing arm 120 in contact with the swing arm 120. The backbone 54 is provided with a platen surface 132 opposite the pressure member 126. The swing arm 120 is provided with an extension 134 for moving the swing arm as will be hereinafter described.

A transducer assembly 136 (see FIGS. 4 and 6) is slideably disposed on a pair of guide rods 138 which are fixed to and within the backbone 54 to extend horizontally as the machine is illustrated. The carriage assembly 136 may be that disclosed in the copending application of Castrodale et al, Ser. No. 776,456, filed Mar. 10, 1977 (now U.S. Pat. No. 4,089,029), and includes a swing arm 140 carrying a magnetic head or transducer 142 that is adapted to extend through a slot 38 in a diskette 30 for data transferring action when the diskette 30 is in a reading/writing position in the machine as will be subsequently explained. The swing arm 140 is mounted with respect to the main body of the assembly 136 by means of a thin flexure spring 144, and a return spring 146 is provided for yieldably moving the swing arm 140 in the direction toward the left side of the machine (which is the same as the left side of the FIG. 4 assembly). The assembly 136 also carries a similar swing arm 140a on its opposite side carrying a transducer 142a to be simultaneously effective on the disk 32 of a diskette 30 along with the transducer 142. The swing arm 140a is supported by flexure spring 144a and is acted on by return spring 146a (see FIG. 6), springs 144a and 146a being similar to springs 144 and 146. The two swing arms 140 and 140a may be interconnected so that they move together in accordance with the teachings of said Castrodale et al application. The swing arm 140 is provided with a tab 148 which overlies the swing arm 120 so that as the swing arm 120 is moved under the action of the spring 124 (in the same counterclockwise direction as seen in FIG. 6), it engages the tab 148 and moves the swing arm 140 against the action of the return spring 146 to disengage the transducer 142 with respect to a disk 32 then beneath the transducer 142. This action of the swing arm 120 will likewise move transducer 142a on the opposite side of the disk 32 away from the disk due to the interconnection between the arms 140 and 140a as described in said Castrodale et al application.

The transducer assembly 136 is slidably moved on the rods 138 (see FIGS. 4 and 6) by means of an electric motor 150 preferably of the electrical stepping type. A thin flexible metal band 151 has a fixed connection 152 with the assembly 136, and the band 151 extends around the output pulley 153 of the motor 150 and around an idler pulley 154 (see FIG. 4) carried by the backbone 54 for moving the transducer assembly 136 when the motor 150 is actuated.

Figure 5:
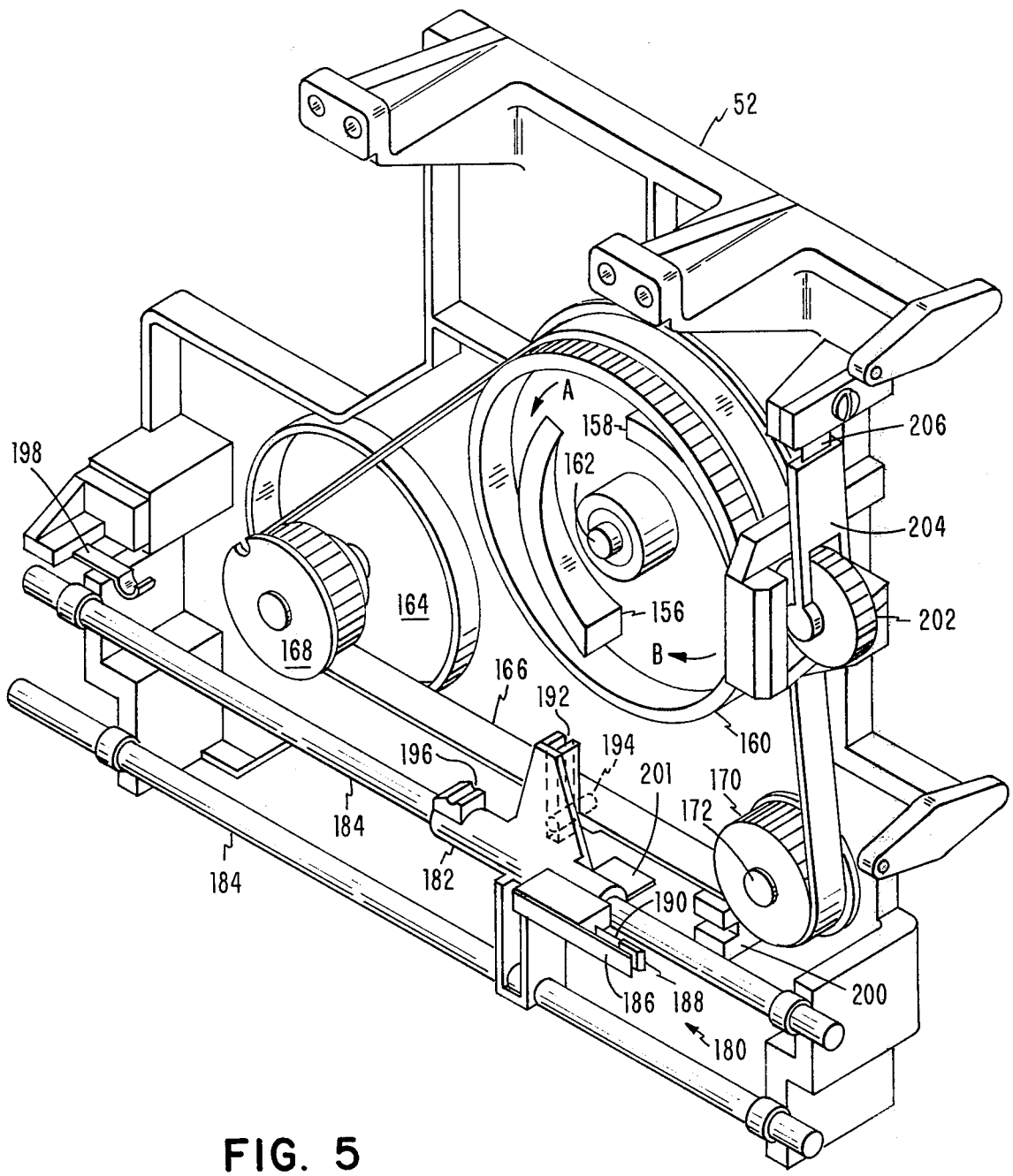
FIG. 5 is a isometric view of other internal parts of the machine including a rotatable cam wheel and taken from line 5—5 of FIG. 1 in the direction indicated.
Figure 11:
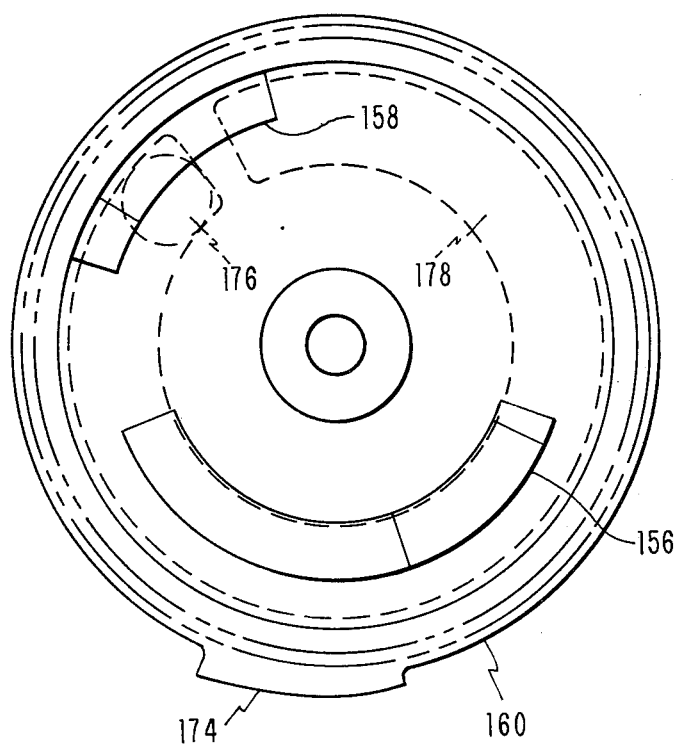
FIG. 11 is a plan view of the cam wheel previously referred to in connection with FIG. 5.
Figure 12:
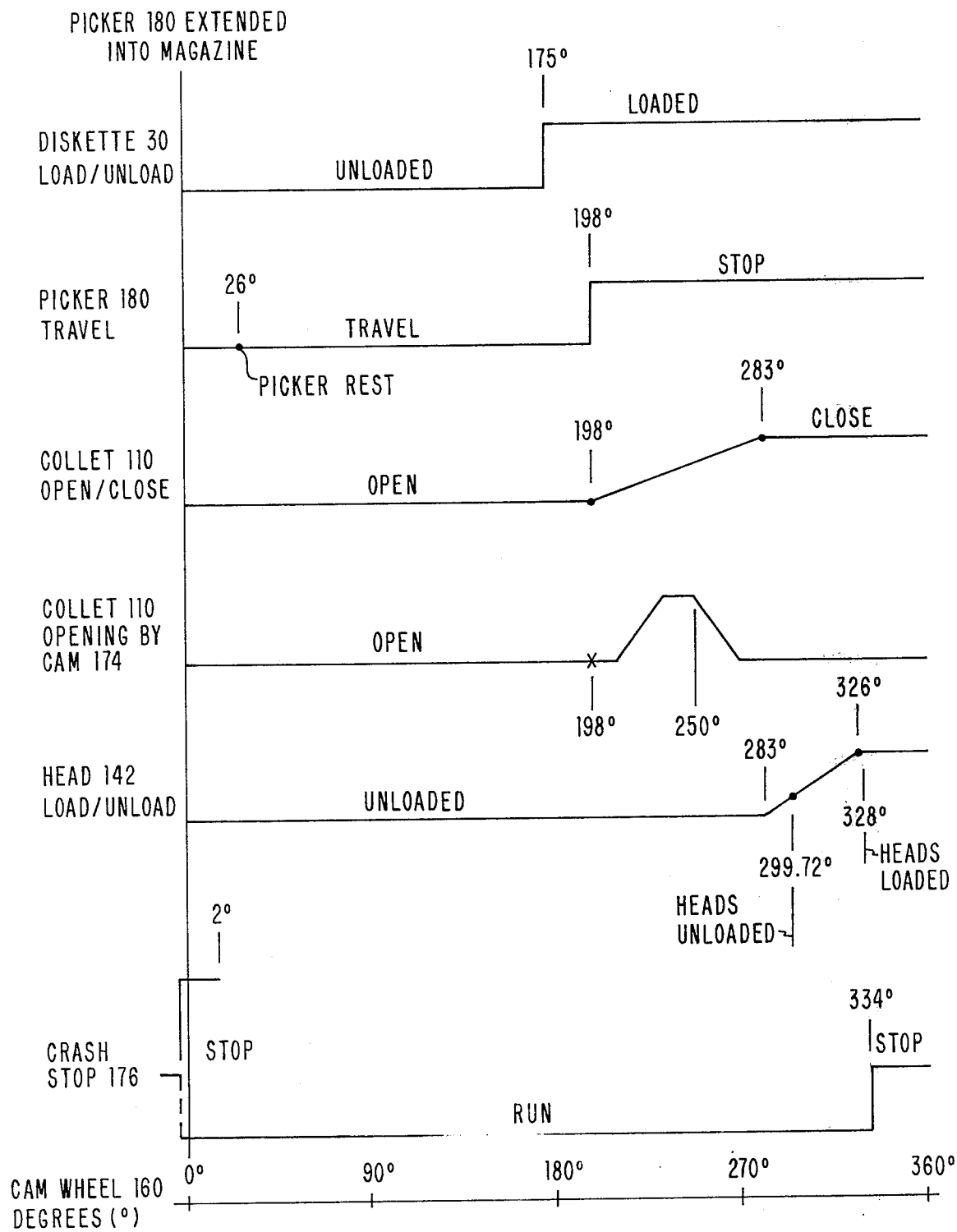
FIG. 12 is a timing diagram showing the relationship between the movements of various of the moveable parts of the machine.

The swing arms 104 and 120 are moved against their return springs 108 and 124 by means of cams 156 and 158 formed on a cam roll or wheel 160 (see FIGS. 5, 6, 7 and 11). The cam wheel 160 is rotatably disposed on the backbone 52 by means of a shaft 162 fixed to the backbone 52. The cam wheel 160 is driven by means of a motor 164 of the electrical stepping type and is in particular driven by an internally toothed belt 166 that passes around the output pulley or roll 168 of the motor 164 and around an idler pulley or roll 170 rotatably disposed on a shaft 172 that is fixed in the backbone 52. The wheel 160 and pulleys 168 and 170 are externally toothed to match with the internal teeth on the belt 166. It will be observed from FIGS. 5 and 11 that the cams 156 and 158 are nearly diametrically opposite each other and that the cam 156 is located closer to the center of the wheel 160 than the cam 158. The cam 156 is in alignment with the roller 116 so that it acts on the roller 116 and moves the swing arm 104 against the return spring 108, and the cam 158 is in alignment with the lever extension 134 so that the cam 158 swings the arm 120 against the action of the return spring 124. It will be observed from FIG. 4 that the roller 116 and the end of the lever extension 134 are just about opposite each other (substantially on the same level with respect to the bed 46), and the cams 156 and 158 are effective on the roller 116 and the lever extension 134 therefore at approximately the same time as the wheel 160 rotates. The wheel 160 is also provided with a cam 174 (see FIG. 11) on its periphery which is effective on the lever extension 118 at times as will be explained. The effective locations of the cams 156 and 158 (as well as the cam 164 effective at times on the lever extension 118) are shown in FIG. 12 particularly by indications of the head 142 load/unload positions and the collet 110 open/close positions. FIG. 11 also sets forth other data timed with respect to the rotation of the cam wheel 160 which will be subsequently referred to. The cam wheel 160 may rotate in either the direction A or in the reverse direction B as indicated in FIG. 5, and its rotation is limited by a pin 176 which is fixed with respect to the backbone 52 and extends into a discontinuous circular channel 178 formed in the rear face of the pulley 160.

A diskette picker assembly 180 is fixed on a reciprocative member 182 that is slideable on a pair of rods 184 held by and fixed with respect to the backbone 52 (see FIG. 5). The assembly 180 includes a pair of arms 186 and 188 anchored in the reciprocable member 182, and the arms 186 and 188 have outwardly diverging cam surfaces on their ends so as to have a clothespin-like configuration and function in this respect. The arm 186 is rigid for its complete length, and the arm 188 has a thin flexible flat spring portion 190 so that the arm ends of the assembly 180 are thus yieldably held together. The assembly 180 may more specifically have the construction disclosed in the copending Beuch et al application, Ser. No. 888,601, filed Mar. 20, 1978.

The reciprocative member 182 is provided with a vertical slot 192, and the slot 192 is adapted to receive the end of a pin 194 that is vulcanized onto the outer side of the belt 166. The reciprocative member 182 is provided with a notch 196, and a detent spring 198 carried by the backbone 52 is adapted to enter into the notch 196 at one end of the travel of the member 182. A sensor switch 200 is provided at the other end of the travel of the reciprocative member 182. The sensor switch 200 may be of the photoelectric type and may be actuated by a blade 201 carried by the member 182.

Figure 3:
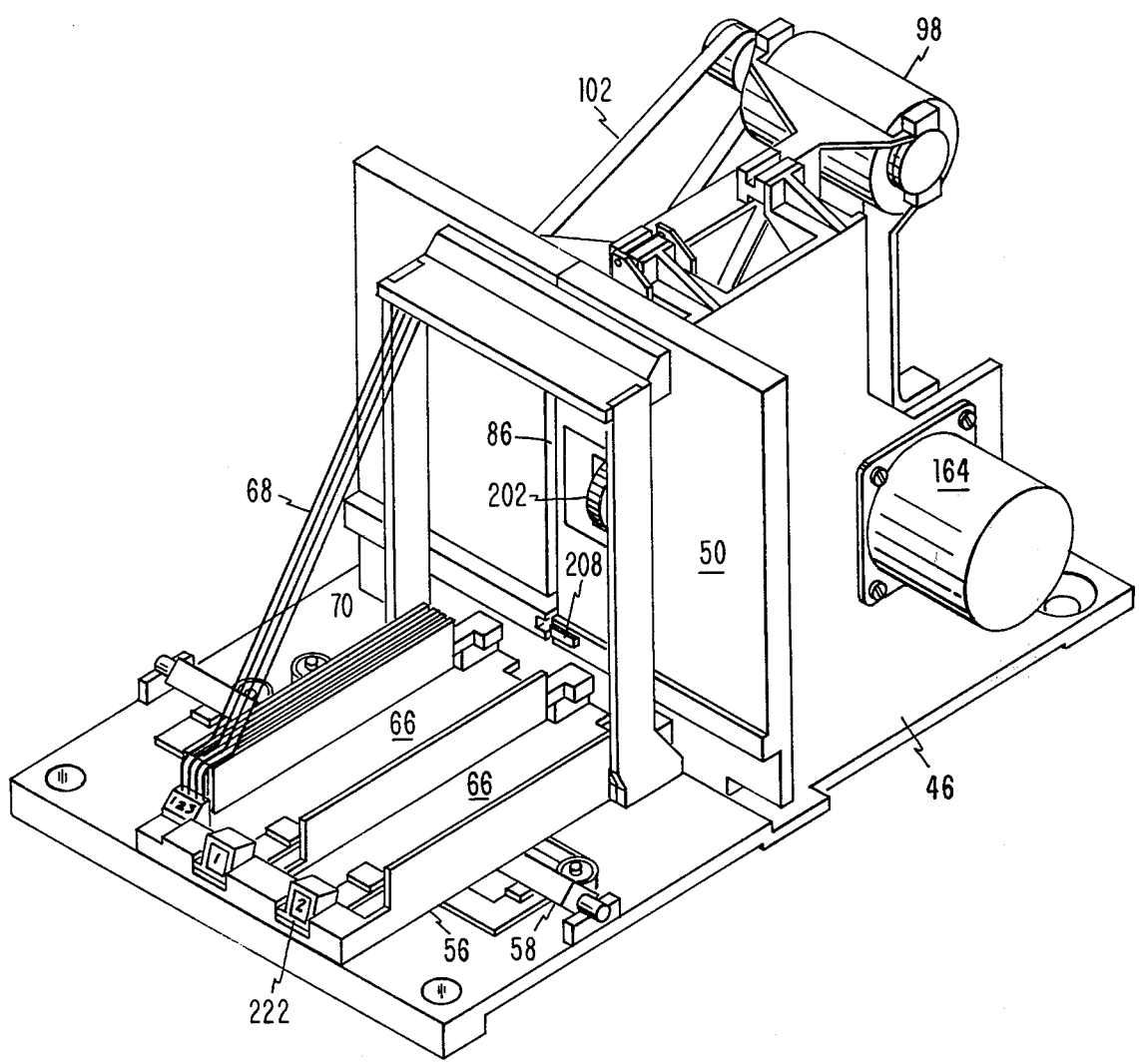
FIG. 3 is an isometric view of the machine taken from the right front end thereof and with the electronic boards being deleted and no magazines being shown in the machine.

It may be a desirable at times to manually rotate the cam wheel 160 and move the other parts of the machine connected operatively with the cam wheel 160, and a thumb wheel 202 is provided for this purpose. The thumb wheel 202 is rotatably carried by a support 204 which in turn is carried by the backbone 52 through the intermediary of a leaf spring 206. The thumb wheel 202 extends through a slot in the standard 50 as seen in FIG. 3 so that the thumb wheel 202 is accessible from the outside of the machine. The thumb wheel 202 may be moved with flexing of the leaf spring 206 to engage its peripheral teeth with the peripheral teeth of the cam wheel 160 located outside of the belt 166.

In order to strip the picker assembly 180 from a diskette 30, it is necessary to hold the diskette from movement. A diskette blocker 208 is provided for this purpose (see FIG. 8), and it extends through a transversely extending slot 210 in communication with the slot 86 between the standards 48 and 50. The blocker 208 is swingably disposed on a pin 212 fixed to the back side of the standard 50, and the blocker 208 is actuated by the swingable armature 214 of an electromagnet 216 that is fixed to the backside of the standard 50. A return spring 218 is provided for the armature 214, and a sensor switch 220 detects the position of the armature 214.

A magazine 42 may be held by any suitable means in a cavity 66 provided in the carriage 56. Such means may include a latch 222 which is urged against the back end of a magazine 42 by means of a leaf spring 224 (see FIGS. 1 and 3).

In operation, a diskette 30 may be positioned for example between a pair of the rods 68 and in the corresponding slot 70 of the carriage 56. The diskette 30 is positioned within the slot 70 in the disposition in which it is shown in FIG. 13, with the slots 38 extending horizontally and with the jacket edge 34a adjacent the slots 38 being located at the slot 86 and at the standards 48 and 50. The picker assembly 180 at this time is drawn inwardly of the machine and may be in its FIG. 5 position. The pin 194 carried by the belt 166 is in engagement with the reciprocative member 182 and is in the slot 192 of this member. The cam wheel 160 and the drive pulley 168 are in their positions as illustrated in FIG. 5.

The motor 72 is actuated at this time so as to move the carriage 56 to bring the diskette 30 so held by the carriage into exact alignment with the slot 86. The motor 72 is effective by means of the belt 74 running over the pulleys 78, 80 and 82 for providing this movement of the carriage 56.

The picker assembly 180 is at this time moved toward the front of the machine (toward the right as seen in FIG. 5). For this purpose, the motor 164 is actuated to drive the belt 166 over the pulleys 168, 160 and 170, with the pulley 160 rotating in direction A. The belt 166 propels the reciprocative member 182 by virtue of the pin 194 engaging in the slot 192, and the member 182 together with the picker assembly 180 are moved toward the front of the machine (toward the right as seen in FIG. 5), with the member 182 sliding on the rails 184. This movement is continued until the picker assembly 180 moves through the slot 86 and embraces the diskette 30 which is retained between a pair of the rods 68 and in one of the grooves 70 of the carriage 56. The diskette 30 is prevented from movement forwardly out of the slot 70 by means of any suitable diskette backing portion of the carriage 56 at the end of the diskette holding groove 70 which is remote from the slot 86. The picker assembly 180 in embracing the diskette 30 has its arm 188 moved away from the arm 186 against the spring action of the spring portion 190, with the outwardly diverging cam surfaces on the ends of the arms 186 and 188 allowing the diskette to enter between the arms. The picker assembly 180 then grips or grasps the diskette 30 by the frictional action of the arms 186 and 188 on the diskette 30 under the action of the flat spring portion 190. It is intended that the electromagnet 216 (see FIG. 8) shall be energized at this time so as to cause its armature 214 to swing the blocker 208 to move it out of alignment with the vertical slot 86. The reciprocative member 182 at the end of its movement toward the front of the machine actuates the switch 200 which may be used as desired for controlling the electromagnet 216 and motor 164. It may be noted that the portion of the blocker 208 that crosses the slot 86 is at a lower level than the picker arms 186 and 188 so that the arms 186 and 188 may go their full stroke forwardly with no interference with the blocker 208 even though the electromagnet 216 might be deenergized at the time.

It will be noted that the picker assembly 180 grasps the diskette 30 at a place very close to the lower edge of the diskette which is in contact with the bottom of the groove 70. The diskette jacket 34 may for example be eight inches (203 mm) square, and the arms 186 and 188 grasp the diskette between 3/16 inch (4.7 mm) and ⅝ inch (15.8 mm) from the lower edge of the diskette jacket 34 in contact with the bottom of the groove 70, with the diskette arms 186 and 188 being of sufficient width to extend for 3/16 inch (4.7 mm) along the side edge 34a of the diskette jacket 34. There will thus be substantially no couples or tilting due to friction on the diskette 30 as it is subsequently drawn back into the machine. It will be understood that these dimensions are given for the purpose of example only and may well be changed.

Figure 10:
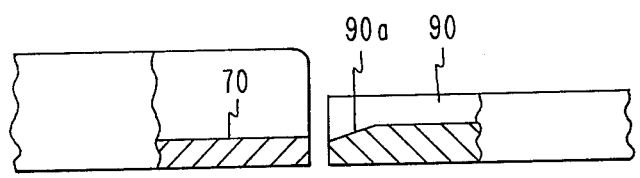
FIG. 10 is a fragmentary sectional view on an enlarged scale taken on line 10—10 of FIG. 4.

With the blocker 208 being out of alignment with the slot 86 by virtue of deenergization of the electromagnet 216, and with the picker assembly 180 engaging the diskette 30, the motor 164 is reversed so as to drive the cam wheel 160 in the direction B by means of the belt 166. The movement of the belt 166 along with the wheel 160 propels the reciprocative member 182 backwardly (to the left as seen in FIG. 5) by virtue of the drive connection between the belt 166 and the member 182 including the pin 194 disposed in the slot 192. The diskette 30 is drawn through the slot 86 along by the picker assembly 180 and moves into and through the groove 90. The bottom of the groove 90 has an initial cam portion 90a as seen in FIG. 10 so that the diskette 30 moves to a level slightly higher than the bottom of the groove 70 when it is in groove 90. The movement of the diskette 30 continues backwardly until the diskette impinges on and is stopped by the protrusion 91 of the backbone 54. The diskette 30 is then in position so that the center of the disk opening 40 is in alignment with the center of the spindle 94 and with the center of the collet 110. A portion of the diskette 30 remains within the slot 86 and part of the diskette protrudes from the slot 86 and lies within the groove 70 in which the diskette 30 was originally positioned, so that the diskette 30 may subsequently be moved fully back into the same slot 70 in which it was originally positioned. If the diskette jacket for example is eight inches (203 mm) square, it may protrude from the slot 86 sufficiently so that 1.9 inches (48 mm) of it may remain in the groove 70. The bottom edge 34b of the diskette jacket 34 rests on the bottom of the groove 90 at this time but has no contact with the bottom of the groove 70 due to the difference in levels of the two groove bottoms. The bottom of the groove 90 at this time thus has the sole control of the level of the diskette 30, which is at its data transferring position with respect to the transducers 142 and 142a. As shown in FIG. 12, which uses the rotation of cam wheel 160 as the abscissa, the wheel 160 has been rotated from 0° to 175° with this movement of the belt 166 fully loading the diskette 30 (into engagement with the protrusion 91).

With the diskette 30 being in engagement with the protrusion 91, movement of the reciprocative member 182 and of the picker assembly 180 continues until the end of movement in this direction is reached at which the detent spring 198 engages in the notch 196 of the member 182. During this movement of the picker assembly 180 and reciprocative member 182 after the diskette 30 has abutted the protrusion 91, the picker arms snap back off of the diskette jacket 34 and the assembly 180 is drawn off of the diskette 30 and is separated from it. The detent spring 198 then holds the reciprocative member 182 and picker assembly 180 in positions disassociated from the diskette 30 during continued operation of the machine either for magnetically reading or writing on the disk 32. The picker assembly 180 thus has no diskette clamping and disk rotation impeding actions at this time. As is indicated in FIG. 12, the diskette 30 may be completely loaded (in abutment with protrusion 91) after about 175° of rotation of the cam wheel 160, and the picker assembly 180 is at the limit of its movement to the left as seen in FIG. 5 at the end of about 198° of rotation of the cam wheel 160.

At the degree of rotation (198°) of the cam wheel 160 in direction B at which the picker assembly 180 is at the limit of its movement backwardly (to the left as seen in FIG. 5), the cam 156 contacts the roller 116, and on continued rotation of the cam wheel 160 in the direction B the cam 156 swings the arm 104 counterclockwise as seen in FIG. 7. The arm 104 is effective through extension portion 112 and the coil spring 114 on the collet 110, and the collet 110 is thus moved into the spindle 94 and through the hole 40 of the diskette 30. The collet 110, being tapered, accurately centers the disk 32 with respect to the longitudinal center line of the spindle 94 and, as the cam wheel 160 continues in its rotation in direction B, clamps the disk 32 between the collet 110 and the spindle 94. As is indicated in FIG. 12, the closing movement of the collet 110 with respect to the disk 32 and spindle 94 takes place between 198° and 283° of the cam wheel 160 for example. The spindle 94 may be in continuous rotation due to the driving action of the motor 98, and when the disk 32 is so clamped between the collet 110 and spindle 94, the disk 32 is drivingly rotated within its stationary jacket 34 in groove 90.

On this continued rotation of the cam wheel 160, with the accompanying movement of the belt 166, the pin 194 travels about the drive pulley 168 and thus moves out of the slot 192 of the reciprocative member 182. The driving connection between the pin 194 and the reciprocative member 182 is thus broken on this and further rotative movement of the cam wheel 160 in direction B and corresponding movement of the belt 166. The pin 194 and slot 192 thus constitute a lost motion connection between the belt 166 and member 182.

When the collet 110 is in full disk clamping position with respect to the spindle 94, such as at 283° of rotation of cam wheel 160, the cam 158 strikes the extension 134 of the swing arm 120 and starts to swing the arm 120 in the clockwise direction as seen in FIG. 6. The tab 148 of the swing arm 140 of the transducer assembly 136 overlies the swing arm 120, and the swing arm 140 of the transducer assembly 136 begins movement toward the disk 32 under the action of the spring 146. The movement of the swing arm 120 continues, such as between 283° and 326° of rotation of cam wheel 160; and, at 326° of rotation, the transducer 142 is in full engagement with the disk 32 through a jacket slot 38. The swing arm 140 of the transducer assembly 132 is then at its fully transducer engaged position, and the transducer 142 may be held in contact with the disk 32 under the action of other spring means incorporated in the transducer carriage assembly 136 as described in said Castrodale et al application. Likewise, the other swing arm 140a on the other side of the disk 32 is at the same time moved to be in full transducer disk engaged position due to the interconnection between the swing arms of the transducer assembly as described in said Castrodale et al application.

The pressure member 126 as previously described is carried by the swing arm 120, and the pressure member 126 clamps the diskette 30 between it and the platen surface 132 of the backbone 54. This occurs simultaneously with the transducer engaging motions just described. This clamping action is by virtue of the spring action of the leaf spring 130 between the swing arm 120 and the pressure member 126, with the ears 128 extending to a greater extent through the swing arm 120. The clamping action by the pressure member 126 on the jacket 34 is upstream (considering the direction of disk rotation C) of the slots 38 in the jacket 34 through which the transducers 142 and 142a extend, the disk rotation direction C being in the clockwise direction as seen in FIG. 13. The spring 130 is of insufficient strength to provide a substantial impedance to the rotation of the disk 32 through the pressure member 126 but is of sufficient strength so that the pressure member 126 maintains the disk 32 in a single desired plane. With the disk 32 being in this plane and with the transducers 142 and 142a being in engagement with the disk 32 through the slots 38, the transducers may be utilized for either writing data on the disk 32 magnetically or magnetically reading previously written data on the disk 32. The transducers 142 and 142a may be moved radially of the disk 32 in the radially extending slots 38 so as to prescribe different concentric magnetic tracks on the disk 32 as the disk rotates by so actuating the motor 150 to move the transducer assembly 136 along the guide rods 138, with the band 151 providing the driving connection between the motor 150 and the transducer assembly 136.

After a data transfer has taken place using the transducers 142 and 142a, the motor 164 is reversed so as to rotate the cam wheel 160 in the direction A. The cam 158 first moves off of the extension 134 of the swing arm 120, and the transducers 142 and 142a are disengaged with a rotation of the cam wheel 160 in direction A from 328° to 299°, for example, as shown in FIG. 12. The swing arm 120 moves under the action of its return spring 124 during this action. The pressure plate 126 is withdrawn from engaging relationship with the platen surface 132 with the same movement of the swing arm 120 so that the diskette 30 is unclamped.

With further rotation of the cam wheel 160 in direction A under the action of the motor 164, the cam 156 rides off of the roller 116 and allows the return spring 108 to swing the swing arm 104 in the clockwise direction as seen in FIG. 7. The swing arm 104 and particularly its extension 112 are then effective to pull the collet 110 out of the driving spindle 94 and completely disengage the collet with respect to the disk 32. As illustrated in FIG. 12, this collet disengaging action may take place between 283° and 198° of rotation of cam wheel 160.

During the cam unloading rotation of cam wheel 160 from 326° to 198° of rotation, the belt 166 of course moves along with the wheel 160, since it has a toothed engagement with the periphery of the wheel 160. The pin 194 travels down toward the drive pulley 168 and at substantially 198° of rotation of wheel 160, the pin 194 enters the slot 192. With further rotation of the wheel 160 in the direction A, the reciprocative member 182 and picker assembly 180 move toward the front of the machine (toward the right as seen in FIG. 5).

With a slight additional movement of the reciprocative member 182 and picker assembly 180 from the position at which the detent spring 198 is in engagement with the sides of the notch 196, the picker assembly 180 contacts the diskette 30 and begins to move the diskette 30 farther out of the groove 90 and farther into the carriage groove 70 in which the diskette 30 was originally placed. Initially, the picker arms 186 and 188 may not embrace the diskette 30, since the pressure provided by the flat spring portion 190 is effective to hold the ends of the arms 186 and 190 in somewhat forceful engagement, but the picker assembly 180 nevertheless is effective for moving the diskette 30 forwardly into its original groove 70.

As the motor 164 continues to drive the cam wheel 160 in the direction A, the reciprocative member 182 and picker assembly 180 continue to propel the diskette 30 forwardly in the original groove 70, until finally the diskette 30 reaches the end of the groove 70. The diskette 30 has then passed completely through the slot 86 and is then completely out of the machine. The picker assembly 180 may then at this time embrace and grip the diskette 30, but this is of no consequence. At this position of the reciprocable member 182, the switch 200 is actuated for control purposes. The electromagnet 216 may be either energized or deenergized during this movement of the diskette 30 into its original groove 70. If the electromagnet 216 is in deenergized condition at this time, the return spring 218 is effective to hold the blocker 208 against the diskette 30 as it travels out of the groove 90, but the return spring 218 is of insufficient effect to provide any substantial impediment to this disk movement.

In order to complete the operation, the electromagnet 216 is deenergized if it has not been previously deenergized; and the spring 218 is effective to swing the blocker 208 so that it lies across the slot 86. The diskette 30 lying in the slot 70 into which it has just been thrust as just described then can have no movement back into the machine. The motor 164 is again reversed to drive the cam wheel 160 in the direction B, and the reciprocative member 182 and the picker assembly 180 are moved back into the machine. The picker assembly arms 186 and 188 snap back off of the diskette jacket 34, and the diskette 30 that has been previously moved into the machine for a reading or writing action is completely released. The carriage 56 may then be moved in direction 64 under the actuation of the motor 72 to move another of the diskettes 30 within another slot 70 and between other spaced rods 68 into alignment with the slot 86 so that a corresponding reading or writing action may take place with respect to this diskette.

Diskettes 30 are held in vertical spaced relation within a magazine 42 by grooves 44 and may be similarly drawn into the machine through slot 86 for a reading or writing action and returned into the same groove 44 within the magazine. It is only necessary that the desired diskette within a certain groove 44 in the magazine be moved initially into alignment with the slot 86 by translating the carriage 56 in direction 64 to accordingly move the magazine. The machine then functions in the same manner as has been previously described in connection with one of the free diskettes 30 held by rods 68, with the picker arms 186 and 188 reaching into the magazine to pull a diskette 30 out of the magazine and finally returning the diskette 30 after data transfer.

Ordinarily, the return spring 108 is effective for moving the collet 110 out of engagement with the disk 32 and spindle 94; however, it can occur that the collet 110 will stick within the disk 32 and spindle 94 if perchance a defective disk 32 with frayed edges in its central opening 40 is used. In this case, the cam 174 is effective on the extension 118 of the swing arm 104 to forceably swing the arm 104 and pull the collet 110 out of engagement with the disk 32 and spindle 94. No jamming of the machine can therefore take place when the picker assembly 180 is subsequently moved to slide the diskette 30 back out of the machine through the slot 86 into either a free groove 70 or into a magazine 42. FIG. 12 shows that this action by the cam 174 takes place as the cam wheel 160 rotates from its 250° position to its 198° position. FIG. 12 also illustrates that the full movement that the cam wheel 160 may have, as limited by the pin 176 and partial circular slot 178, is between −2° and 334°, a slightly greater travel than between the 0° and 328° for ordinary operation of the machine.

We claim:

1. A machine for providing data transference with thin flat information carrying disk units including:
   means for holding such a disk unit in an original position thereof,
   means for grasping the disk unit and including a pair of arms extending side by side from a place of mutual attachment to distal arms ends having outwardly diverging cam surfaces thereon and resilient means for urging the distal arm ends together,
   driving means for reciprocatively moving said grasping means in a certain path and in a first direction from a position opposite and spaced from a side edge of the disk unit toward said side edge of the disk unit while the disk unit is in its said original position so that said outwardly diverging cam surfaces cam over this side edge of the disk unit and said distal arm ends frictionally engage the opposite side faces of the disk unit so that the grasping means grasps the disk unit and the driving means then moving said grasping means in the second opposite direction in said path to thereby pull the disk unit into a final data transferring position, and
   a transducer for transferring data with respect to the disk unit when it is in its said data transferring position.

2. A machine as set forth in claim 1 and including a stop for limiting the movement of said disk unit in said second direction to its said data transferring position and allowing said arms to strip off of the disk unit on continued movement of the grasping means in said second direction with said disk unit remaining in its said data transferring position.

3. A machine as set forth in claim 2 and including additional stop means for preventing movement of said disk unit out of its said original position toward its said data transferring position while said arms grasp the disk unit, and selectively operable means for rendering said additional stop means ineffective for preventing movement of said disk unit from its said original position to its said data transferring position.

4. A machine as set forth in claim 1 and including a rotatable driving spindle for driving the disk of said disk unit when the disk unit is in its said data transferring position and a clamp adapted to clamp the disk between it and said spindle whereby to cause rotation of said disk, and common driving means for said clamp and said transducer for moving said clamp to clamp said disk between it and said spindle and to move said transducer into data transferring relationship with respect to said disk when said disk unit is in its said data transferring position.

5. A machine as set forth in claim 1 and including means forming a groove for supporting said disk unit in a vertical disposition in its said original position and means forming a groove for supporting said disk unit in a vertical disposition in its said data transferring position, said grooves being in alignment to allow the transference of said disk unit from its original position to its data transferring position and the bottom of said groove supporting said disk unit in its data transferring position being higher than the bottom of said groove supporting said disk unit in its said original position and having an upwardly extending cam surface for camming said disk unit upwardly as it moves into said groove supporting said disk unit in its said data transferring position.

6. A machine as set forth in claim 1 and including a carriage for holding said disk unit in its said original position and a series of additional disk units of the same type as said first named disk unit in spaced and parallel relationship with respect to each other and to said first named disk unit, and means for moving said carriage transversely with respect to said path of said grasping means so that said grasping means may be effective on any of the disk units held by said carriage.

7. A machine as set forth in claim 1, said means for holding a disk unit including a cartridge which is substantially closed on its opposite top and bottom, and on opposite sides and on one end leaving the other end open through which the thin flat information carrying disk unit may be moved, said certain path of said grasping means extending into said open end of said cartridge so that the grasping means may move through said open end to grip the information carrying disk unit in said cartridge and draw it out of the cartridge.

8. A machine for providing data transference with thin flat information carrying disk units including:
   means for holding such a disk unit in a vertical upstanding disposition in an original position thereof,
   means for embracing and grasping the disk unit and including a pair of opposite arms,
   means for moving said grasping means in a first direction in a certain path from a position opposite and spaced from a side edge of the disk unit toward said side edge of the disk unit while the disk unit is in its said original position so that said arms embrace and pass over said edge and onto a marginal edge portion of the disk unit,
   means for moving said arms together so that they grasp and frictionally engage said marginal edge portion,
   said moving means being subsequently operative to move said grasping means in a second opposite direction so that said grasping means pulls the disk unit into a vertical upstanding data transferring final position, and
   a base surface for supporting said disk unit in its said original position and a base surface for supporting said disk unit in its said data transferring position whereby the disk unit slides on said first named base base surface and then on said second named base surface in moving from its said original position to its data transferring position under the action of said grasping means,
   said grasping means being positioned on said side edge of the disk unit so that the grasping means embraces this side edge of the disk unit adjacent the lower edge of the disk unit and remote from the upper edge of the disk unit so as to provide an insubstantial couple on the disk unit with respect to said base surfaces when said grasping means is effective to move said disk unit into its data transferring position.

9. A machine for providing data transference with flat information carrying disk units including:
   means for holding such a disk unit in an original position thereof,
   means for grasping the disk unit by a marginal edge portion thereof by engagement on opposite side faces of the disk unit adjacent said edge,
   means for drivingly moving said grasping means in a first direction toward said edge of the disk unit, and
   means for actuating said grasping means so that as the grasping means is moved in said first direction it embraces and grips the disk unit,
   said moving means being then operative to move said grasping means in a second opposite direction to thereby pull the disk unit out of its original position and into a final data transferring position,
   said moving means including a belt having a driving connection with said grasping means, a plurality of rolls about which said belt is disposed in looped form, and means for driving one of said rolls in opposite directions so as to thereby drive said belt in opposite directions and thereby drive said grasping means in opposite directions.

10. A machine as set forth in claim 9 and including a transducer movable into data transferring relationship with said disk unit when it is in its said data transferring position and cam means on one of said rolls and effective for causing movement of said transducer into a data transferring relationship with said disk unit when said disk unit is in its said data transferring position.

11. A machine as set forth in claim 10, said disk unit being of the type including a thin flexible magnetic disk enclosed within an envelope having a radial slot in one of its thicknesses for receiving said transducer, and clamping means including a stationary platen surface and a movable clamp effective for clamping the disk unit adjacent its said slot and cam means carried by one of said rolls effective on said clamping means for clamping said disk unit onto said platen surface when said transducer is moved into data transferring relationship with said disk.

12. A machine as set forth in claim 10, said grasping means including a pair of opposite arms extending along side of each other and resilient means for urging the arms together whereby the arms frictionally engage the opposite side faces of the disk unit, the machine including stop means for said disk unit in its said data transferring position whereby said grasping means is drawn off of said disk unit with said opposite arms sliding along and thereby disengaging from the disk unit on continued movement of said grasping means by said belt in said second direction and said cam means being then effective for causing said transducer to move into data transferring relationship with said disk unit.

13. A method for transferring data with respect to thin flat information carrying disk units including the steps of:
   holding such a disk unit in an original position,
   moving an assembly of a pair of separable arms in one direction toward and across an adjacent edge of the disk unit in its original position so that the arms embrace a marginal edge portion of the disk unit,
   camming said arms apart due to contact of said arms on said edge as the arms cross said edge in moving in said one direction,
   applying a force on said arms of such direction to tend to hold and move them together during such movement of said arms as an assembly in said one direction so that said camming is against said force and so that the arms frictionally engage said marginal edge portion and opposite side faces of the disk unit to grip the disk unit,
   moving said arms as an assembly in the opposite direction while maintaining said force to continue the grip of said arms on said disk unit so that the arms move said disk unit from its said original position into a final data transferring position, and
   moving a transducer into data transferring relationship with respect to said disk unit while the disk unit is in its said data transferring position.

14. A method for transferring data as set forth in claim 13, said disk unit being held in its said original position along with a series of additional such disk units in a cartridge having a substantially closed top and bottom and substantially closed opposite sides and a substantially closed end leaving the other end of the cartridge open through which said disk unit may be moved from its said original position to its said data transferring position by means of said arms as an assembly.

15. A method for transferring data with respect to thin flat information carrying disk units including the steps of:

holding such a disk unit in an original position in upright disposition and resting on a base support, grasping the disk unit by means of a pair of opposite arms extending along side of each other by moving the arms as an assembly in one direction onto a marginal portion of the disk unit with the arms being on opposite sides of the disk unit and applying a force onto the arms so as to cause them to frictionally engage with the opposite side surfaces of the disk unit to thus grasp the disk unit, and moving said arms as an assembly in grasping relation with said disk unit in the opposite direction so at to thereby slide said disk unit on said base surface from its said original position into a data transferring position, and moving a transducer into data transferring relationship with respect to said disk unit while it is in its data transferring position, said drums being so effective on said disk unit to grasp the disk unit in its original position and to move it along said base support with the arms being applied to said marginal edge portion of the disk unit at a place adjacent the lower edge of the disk unit in contact with said base support and relatively removed from the opposite upper edge of the disk unit so as to provide an insubstantial couple on the disk with respect to said base support when said arms are effective to move said disk unit from its said original position to its said data transferring position.

* * * * *